United States Patent [19]

Saheki et al.

[11] Patent Number: 5,059,371
[45] Date of Patent: Oct. 22, 1991

[54] METHOD AND APPARATUS FOR EXTRUSION MOLDING FIBER-AND CEMENT-CONTAINING W/O TYPE EMULSION

[75] Inventors: Takasi Saheki; Hideaki Matsuda, both of Marugame, Japan

[73] Assignee: Okura Kogyo Kabushiki Kaisha, Japan

[21] Appl. No.: 39,007

[22] Filed: Apr. 15, 1987

[30] Foreign Application Priority Data

Apr. 26, 1986 [JP] Japan .................................. 61-95915

[51] Int. Cl.$^5$ ........................................... B29C 47/12
[52] U.S. Cl. ............................. 264/108; 264/211.24; 264/333; 425/382.4; 425/467
[58] Field of Search ............. 264/108, 211.11, 211.24, 264/333, 176.1, 82, 109, 125, 126, 42; 425/376 A, 466, 467, 206, 207, 382.4

[56] References Cited

U.S. PATENT DOCUMENTS

| | | | |
|---|---|---|---|
| 3,168,509 | 2/1965 | Juel | 264/176.1 |
| 3,267,518 | 8/1966 | Juel et al. | 425/467 |
| 3,532,781 | 10/1970 | Shannon | 264/333 |
| 3,901,991 | 8/1975 | Ueda et al. | 264/333 |
| 3,972,969 | 8/1976 | Rio et al. | 264/82 |
| 4,002,713 | 1/1977 | Duncan et al. | 264/333 |
| 4,048,276 | 9/1977 | Hansen et al. | 264/82 |
| 4,125,497 | 11/1978 | Josten et al. | 264/333 |
| 4,202,857 | 5/1980 | Lowe | 264/333 |
| 4,271,112 | 6/1981 | Rossman et al. | 264/108 |
| 4,293,517 | 10/1981 | Knox | 425/376 A |

FOREIGN PATENT DOCUMENTS

| | | | |
|---|---|---|---|
| 51-19017 | 2/1976 | Japan | 264/211.11 |
| 52-44841 | 4/1977 | Japan | 264/211.11 |

*Primary Examiner*—Jeffery Thurlow
*Attorney, Agent, or Firm*—Rosenman & Colin

[57] ABSTRACT

In the case of extruding a W/O type emulsion having a high viscosity obtained by stirring a mixture of a vinyl monomer solution composed of a vinyl monomer which is water insoluble and in a liquid state at normal temperature, a surface active agent having a hydrophilic-lipophylic balance of 3 to 6, and a polymerization catalyst with water, cement, and synthetic fibers through a die, at least one rectifying plate having a given form is disposed in the die near the outlet thereof to direct the synthetic fibers in the W/O type emulsion to the extruding direction.

When the tabular plate obtained by extrusion-molding the W/O type emulsion by the method of this invention is hardened and dried, a light-weight and high-strength plastic concrete suitable for building materials is obtained.

14 Claims, 1 Drawing Sheet

METHOD AND APPARATUS FOR EXTRUSION MOLDING FIBER-AND CEMENT-CONTAINING W/O TYPE EMULSION

FIELD OF THE INVENTION

This invention relates to a method and apparatus for producing plastic concrete moldings suitable for light weight and high strength building materials, etc., by stirring a mixture of reinforcing fibers, cement, water, and a vinyl monomer solution containing dissolved therein a surface active agent and a polymerization catalyst to form a W/O type emulsion, extrusion-molding the emulsion while directing the reinforcing fibers to the extruding direction, and hardening and drying the moldings.

BACKGROUND OF THE INVENTION

When a W/O type emulsion formed by stirring a mixture of reinforcing fibers, cement, water, and a vinyl monomer solution containing dissolved therein a surface active agent and a polymerization catalyst is extrusion molded by using a fishtail die or a coat hanger die, the directions of the reinforcing fibers are liable to become random and thus, it is difficult to obtain moldings having desired strength characteristics. This tendency is particularly remarkable in the case of extrusion-molding tabular materials having a relatively wide width and a thick thickness.

That is, in the case of forming tabular materials having a relatively wide width by extrusion-molding, the emulsion is spread on both sides by means of the die to form a tabular molding. The plastic concrete obtained by hardening and drying the emulsion molding thus formed is a porous and light-weight material but in this case, the reinforcing fibers contained in the emulsion are, as a matter of course, directed in the width wise direction. Thus, the bending strength of the plastic concrete moldings obtained is high in the width wise direction and weak in the lengthwise direction, which causes problems as building materials for practical purposes. Also, when the thickness of tabular moldings to be molded is over the length of reinforcing fibers, the reinforcing fibers are partially directed to the thickness direction and the reinforcing fibers thus directed to the thickness direction do not give the reinforcing effect in the lengthwise direction.

About tabular moldings for building materials, etc., it is actually adventageous considering from the stand point of the balance in strength that the moldings have a high bending strength in the lengthwise direction as compared to the width wise direction. Thus, for meeting the requirement in strength for building materials as described above, it has been desired that the reinforcing fibers are dispersed in plane direction and the ratio of reinforcing fibers directed to the lengthwise direction is high.

SUMMARY OF THE INVENTION

As the result of investigations for solving the various problems as described above and discovering a process for producing cement-containing W/O type emulsion moldings wherein reinforcing fibers are effectively directed to the extruding direction for the moldings, it has been discovered that reinforcing fibers are effectively directed to the lengthwise direction of a molding formed without clinging to rectifying plates by continuously extrusion-molding a tabular molding having a relatively wide width and a thick thickness using a molding die equipped with rectifying plates having a tear-drop-shape before the die lip of the molding die at extrusion molding so that the rectifying plates are parallel to the die lip, the thick head portion of the rectifying plate is disposed at the opposite side to the die lip and the thin tail portion of the rectifying plate is at the die lip side.

DETAILED EXPLANATION OF THE INVENTION

Then, the invention is explained in detail.

Figure 3:
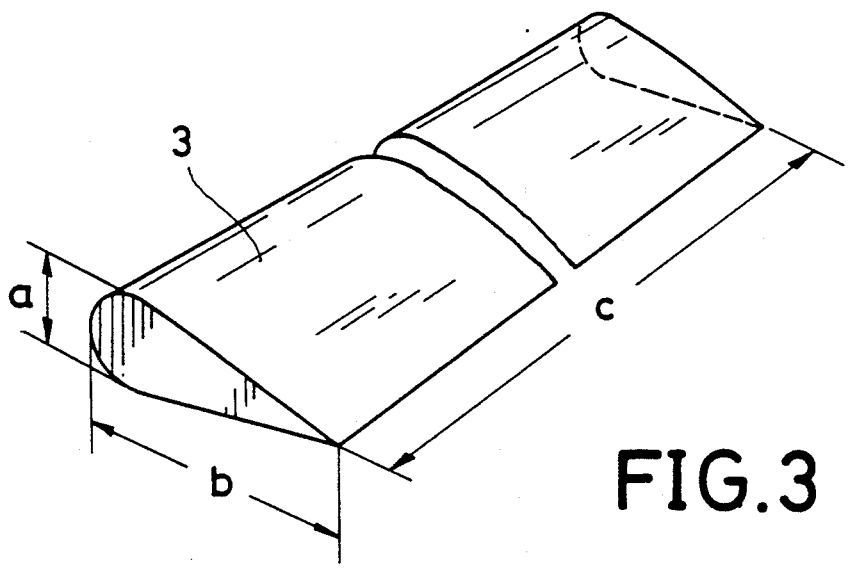
FIG. 3 is a slant view showing the tear-drop-form rectifying plate of this invention.

The length of reinforcing fibers for use in this invention is generally about 3 mm to 12 mm and if the fiber length is assumed to be 1, it is preferred that the thickness of the thickest head portion (a) shown in FIG. 3 is longer than 0.5. If the thickness thereof is less than 0.5, the reinforcing fibers are liable to cling to the rectifying plates. Also, it is proper that the length (b) between the top of the round head portion of the tear-drop-form rectifying plate 3 and the end of the tail portion thereof is from twice to 10 times the length of (a). Furthermore, there is no particular restriction on the number of rectifying plates but the directivity of the reinforcing fibers is increased with the increase of the number of the rectifying plates.

The invention is described in more detail by referring to the accompanying drawings.

Figure 1:
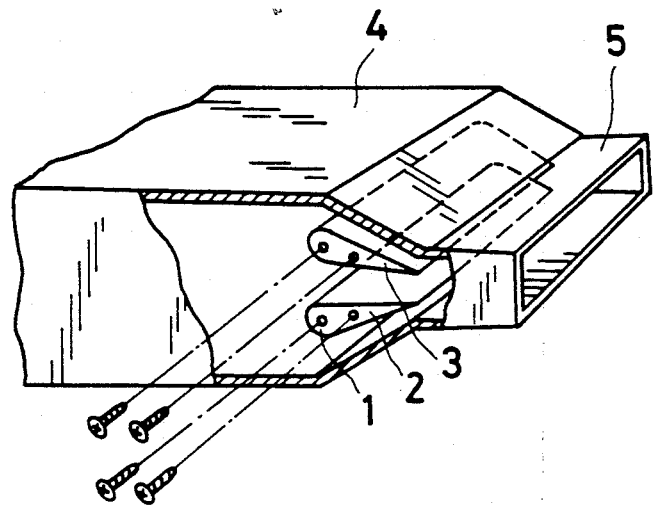
FIG. 1 is a partially opened slant view of a die equipped with tear-drop-form rectifying plates of this invention.

FIG. 1 is a partially opened slant view of the die for use in this invention equipped with tear-drop-form rectifying plates therein, wherein numeral 1 shows a thick round head portion of the rectifying plate and numeral 2 shows a thin tail portion thereof. The rectifying plates are fixed to the die by screws as shown in FIG. 1.

Figure 2:
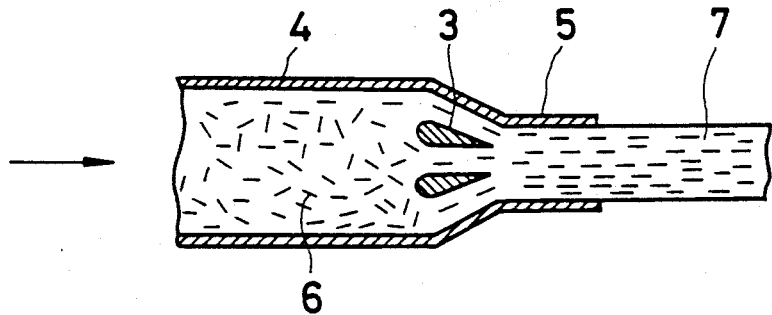
FIG. 2 is a cross sectional view of the top portion of a die.

FIG. 2 is a cross sectional view of the top portion of a die equipped with rectifying plates each having a tear-drop-shape section, wherein numeral 3 shows the rectifying plate having a tear-drop-shape section equipped to the inside of the die 4 having a die lip 5. Numeral 6 shows reinforcing fibers contained in a cement-containing W/O type emulsion and numeral 7 shows the directed reinforcing fibers in the molded plate portion of the W/O type emulsion.

As shown in FIG. 2, the reinforcing fibers 6 in the cement-containing W/O type emulsion sent by an extruder are effectively directed by the rectifying plates 3 each having a tear-drop-shape section and the cement-containing emulsion containing thus directed reinforcing fibers 7 is molded into a tabular form through the die lip 5. In general, it is effective that the rectifying plates 3 are disposed near the die lip and at the narrowing portion of the die as shown in FIG. 2.

The W/O type emulsion for use in this invention is prepared by stirring a mixture of reinforcing fibers, cement, water, and a vinyl monomer solution containing dissolved therein a surface active agent and a polymerization catalyst.

As the surface active agent which is used for preparing the W/O type emulsion, there are non-ionic or ionic surface active agents having a hydrophilic-lipophilic balance of 3 to 6, such as sorbitan sesquioleate, glycerol monostearate, sorbitan monostearate, diglycerol monooleate, a dibasic acid anhydride addition product of a polyalkylene glycol, the neutralization products thereof, etc.

The vinyl monomer which is used for preparing the W/O type emulsion may be a water-insolube vinyl monomer which is in a liquid state at normal temperature. For example, there are styrene, α-methylstyrene, acrylic acid esters methacrylic acid esters, acrylonitrile, divinyl-benzene, the acrylic acid or methacrylic acid esters of alkylene glycol, acrylic acid or methacrylic acid esters of polyhydric alcohol, etc. In general, it is preferred to use a divinyl compound or a trivinyl compound, such as ethylene glycol dimethacrylate, trimethylolpropane trimethacrylate, etc., together with the aforesaid vinyl monomer.

As the polymerization catalyst which is used for polymerizing the vinyl monomer(s) described above, there are radical forming agents and redox catalysts.

There is no particular restriction about the cement for preparing the W/O type emulsion and there are, for example, Portland cement, blast furnace cement, fly ash cement, silica cement, magnesia cement, alumina cement, etc.

The reinforcing fibers for use in this invention are synthetic fibers having a length of 3 to 12 mm, with an aspect ratio of about 100 to 1,000, and a good affinity for emulsion.

In this invention, a composition composed of the above-described reinforcing fibers, cement, water, and the vinyl monomer solution containing dissolved therein the surface active agent and the polymerization catalyst is extrusion-molded as the W/O type emulsion.

As the extruder for use in this invention, there is a general extruder having uniaxial or diaxial screw. Also, the preparation of the W/O type emulsion and the extrusion molding may be simultaneously performed using a continuous kneader having a stirring and kneading function and an extruding function.

When the extrusion-molded product of the W/O type emulsion containing cement and the effectively directed reinforcing fibers obtained by the method described above is allowed to stand at normal temperature, the polymerization reaction of the vinyl monomer and the hydration reaction of the cement proceed to harden the product. If it is desired to quicken the hardening of the product by accelerating the polymerization reaction, the molded product may be heated in saturated steam. Also, rapid-hardening cement or a quick hardening agent may be used according to a requirement.

Then, by drying the W/O type emulsion molding thus hardened, a plastic concrete molding effectively reinforced by the reinforcing fibers in spite of the porous and light-weight properties is obtained. Also, by properly selecting the ratio of cement and water, a plastic concrete molding having a relatively high specific gravity and high strength can be obtained.

The most important feature of this invention is in the point that the reinforcing fibers contained in the W/O type emulsion can be effectively directed to the extruding direction by employing tear-drop-form rectifying plates in the extrusion molding die. This invention is particularly suitable for producing tabular materials, piller shaped materials, etc., which are required to have a high bending strength in the longitudinal direction by continuous extrusion molding. Thus, by using the method or apparatus of this invention, it becomes possible to obtain extrusion molded products most effectively reinforced with the minimum amount of reinforcing fibers.

The light-weight plastic concrete moldings obtained by the method of this invention as described above can be advantageously used for walls, etc., of building materials in the case of tabular materials and for piller or crossbeams, etc., of building materials in the case of piller shaped products.

Then, the invention is further described practically by the following examples.

EXAMPLE 1

To the outlet of a continuous kneader having a kneading function and an extruding function was equipped with a coat hanger die having an outlet of 18 mm×455 mm provided with one tear-drop-form rectifying plate having a length (b) of 30 mm, a length (a) of 6 mm, and a length (c) of 455 mm as shown in FIG. 3 and 18.6 parts by weight/hour of a vinyl monomer solution containing dissolved therein 71.3 parts by weight of styrene monomer, 25 parts by weight of sorbitan monooleate, 3.8 parts by weight of trimethylolpropane trimethacrylate, and 1 part by weight of t-butylperoxy benzoate, 186.2 parts by weight/hour of Portland cement, 372.0 parts by weight/hour of water, and 6 parts by weight/hour of acrylic fibers having a length of about 6 mm and an aspect ratio of 333 were continuously supplied to the kneader to simultaneously perform the preparation of a W/O type emulsion and extrusion molding, whereby a tabular material of 18 mm in thickness, 455 mm in width, and 3,030 mm in length containing the effectively directed reinforcing fibers was continuously prepared. Then, by curing the molding for 2 weeks followed by drying, a light-weight plastic concrete plate having a specific gravity of 0.6 was obtained. The bending strength of the light-weight plastic concrete plate was 30 kg/cm$^2$ in the width wise direction and 45 kg/cm$^2$ in the lengthwise direction and the ratio of the former to the latter was 1/1.5.

EXAMPLE 2

By following the same procedure as Example 1 except that two rectifying plates were used, a light-weight plastic concrete plate of 18 mm in thickness, 455 mm in width, and 3,030 mm in length was obtained. The specific gravity of the light-weight plastic concrete plate was 0.6 and the strength of it was 25 kg/cm$^2$ in the width wise direction and 50 kg/cm$^2$ in the lengthwise direction and the ratio thereof was ½.

EXAMPLE 3

A W/O type emulsion was prepared by adding 500 parts by weight of Portland cement, 700 parts by weight of water, 100 parts by weight of perlite, 50 parts by weight of vinylon fibers having a length of about 6 mm and an aspect ratio of 428 to 100 parts by weight of a vinyl monomer solution obtained by mixing 60 parts by weight of styrene monomer, 20 parts by weight of ethylene glycol dimethacrylate, 20 parts by weight of a maleic anhydride addition product of polypropylene glycol having a mean molecular weight of 2,000, and 1 part by weight of t-butylperoxyisopropyl carbonate and kneading the mixture obtained using a kneader.

The W/O type emulsion thus prepared was supplied to an extruder equipped with a coat hanger die having an opening portion of 12 mm×455 mm and provided with three tear-drop-form rectifying plates each having a length (a) of 5 mm, a length (b) of 25 mm, and a length (c) of 455 mm as shown in FIG. 3 for extrusion molding and a tabular material of 12 mm in thickness, 455 mm in width, and 3,030 mm in length containing effectively directed reinforcing fibers was continuously produced. By curing the molding for 7 days at 40° C. and 100% RH followed by drying, a light-weight plastic concrete having a specific gravity of 0.55 was obtained. The bending strength of the light-weight plastic concrete plate thus obtained was 16 kg/cm$^2$ in the width wise direction and 40 kg/cm$^2$ in the lengthwise direction and the ratio thereof was 1/2.5.

EXAMPLE 4

By continuously supplying 21.6 parts by weight/hour of a vinyl monomer solution obtained by mixing 76 parts by weight of stylene monomer, 4 parts by weight of trimethylolpropane trimethacrylate, 20 parts by weight of diglycerol monooleate, and 1 part by weight t-butylperoxy benzoate, 475.7 parts by weight/hour of Portland cement, 302.7 parts by weight/hour of water, and 8 parts by weight/hour of acrylic fibers having a length of 12 mm and an aspect ratio of 667 to a continuous kneader having a kneading function and an extruding function equipped with a coat hanger die having an outlet of 18 mm×455 mm and provided with two tear-drop-form rectifying plates each having a length (b) of 40 mm, a length (c) of 455 mm, and a length (a) of 18 mm as shown in FIG. 3, the preparation of a W/O type emulsion and extrusion molding of the emulsion were simultaneously performed, whereby a tabular plate of 18 mm in thickness, 455 mm in width, and 3,030 mm in length containing the effectively directed reinforcing fibers was continuously produced. By curing the molding for 2 weeks at normal temperature followed by drying, a plastic concrete plate having a specific gravity of 1.2 was obtained. The bending strength of the plastic concrete plate obtained was 89 kg/cm$^2$ in the width wise direction and 125 kg/cm$^2$ in the lengthwise direction and the ratio thereof was 1/1.4.

COMPARISON EXAMPLE

By following the same procedure as Example 1 except that the coat hanger die having no rectifying plate was used, a tabular material of 18 mm in thickness, 455 mm in width, and 3,030 mm in length was continuously produced. By curing the molding for 2 weeks at room temperature followed by drying, a light-weight plastic concrete plate having a specific gravity of 0.6 was obtained. The bending strength of the light-weight plastic concrete was 38 kg/cm$^2$ in the width wise direction and 30.4 kg/cm$^2$ in the lengthwise direction and the ratio thereof was 1/0.8.

What is claimed is:

1. A method of extrusion molding a W/O type emulsion obtained by stirring a mixture of a vinyl monomer solution composed of a vinyl monomer which is water insoluble and in a liquid state at normal temperature, a surface active agent having a hydrophilic-lipophilic balance of 3 to 6, and a polymerization catalyst, water, cement, and fibers through a die, wherein the length of said fibers is 3 mm to 12 mm and the aspect ratio thereof is 100 to 1,000, which comprises rectifying the stream of the emulsion in the die near the die lip of the die to direct the fibers in the emulsion to the extruding direction.

2. The method as claimed in claim 1, wherein the vinyl monomer is a mixture of a vinyl monomer selected from styrene, α-methylstyrene, an acrylic acid ester, an acrylonitrile, divinylbenzene, an acrylic acid ester or methacrylic acid ester of an alkylene glycol, and an acrylic acid ester or methacrylic acid ester of a polyhydric alcohol and a monomer selected from ethylene glycol dimethacrylate and trimethylolpropane trimethacrylate.

3. The method as claimed in claim 1, wherein the surface active agent having a hydrophilic-lipophilic balance of 3 to 6 is at least one of sorbitan sesquioleate, glycerol monostearate, sorbitan monooleate, diethylene glycol monostearate, sorbitan monostearate, diglycerol monooleate, dibasic acid anhydride addition product of a polyalkylene glycol, and a neutralized product thereof.

4. The method as claimed in claim 1, wherein the polymerization catalyst is a radical-forming agent or a redox catalyst.

5. The method as claimed in claim 1, wherein the fibers are synthetic fibers having a good affinity with the W/O type emulsion.

6. The method as claimed in claim 1, wherein the cement is Portland cement, blast furnace cement, fly ash cement, silica cement, magnesia cement, or alumina cement.

7. The method as claimed in claim 1, wherein the W/O type emulsion is composed of 18.6 parts by weight of a vinyl monomer solution, 186.2 parts by weight of Portland cement, 375.0 parts by weight of water, and 6 parts by weight of acrylic fibers having a length of 6 mm and an aspect ratio of 333, said vinyl monomer solution being composed of 71.3 parts by weight of styrene monomer and trimethylolpropane trimethacrylate as the vinyl monomer, 25.0 parts by weight of sorbitan monooleate as the surface active agent, and 1 part by weight of t-butylperoxy benzoate as the catalyst.

8. The method as claimed in claim 1, wherein the W/O type emulsion is composed of 100 parts by weight of a vinyl monomer solution, 500 parts by weight of Portland cement, 700 parts by weight of water, 100 parts by weight of perlite, and 50 parts by weight of vinylon fibers having a length of 6 mm and an aspect ratio of 428, said vinyl monomer solution being composed of 60 parts by weight of styrene monomer and 20 parts by weight of ethylene glycol dimethacrylate as the vinyl monomer, 20 parts by weight of a maleic anhydride addition product of polypropylene glycol having a mean molecular weight of 2,000 as the surface active agent, and 1 part by weight of t-butylperoxyisopropyl carbonate as the catalyst.

9. The method as claimed in claim 1, wherein the W/O type emulsion is composed of 21.6 parts by weight of a vinyl monomer solution, 475.7 parts by weight of Portland cement, 302.7 parts by weight of water, and 8 parts by weight of acrylic fibers having a length of 12 mm and an aspect ratio of 667, said vinyl monomer solution being composed of 76 parts by weight of styrene monomer and 4 parts by weight of trimethylolpropane trimethacrylate as the vinyl monomer, 20 parts by weight of diglycerol monooleate as the surface active agent, and 1 part by weight of t-butylperoxy benzoate as the catalyst.

10. An apparatus for extrusion molding a W/O type emulsion containing fibers and cement, comprising an extrusion die equipped with at least one rectifying plate having a tear-drop-shape section in the die near the die lip thereof disposed in the extruding direction so that the round head portion of the rectifying plate is disposed at the opposite side to the die lip and the thin tail portion of the rectifying plate is at the die lip side, the thickness of the round head portion of the rectifying plate being at least ½ of the length of the fibers in the W/O type emulsion.

11. The apparatus as claimed in claim 10, wherein the length from the top of the head portion of the rectifying plate to the end of the tail portion thereof is 2 to 10 times the thickness of the head portion.

12. The apparatus as claimed in claim 10, wherein the rectifying plate(s) are disposed in the narrowing portion of the molding die near the die lip thereof.

13. The apparatus as claimed in claim 10, wherein plural rectifying plates are disposed in the die.

14. The apparatus as claimed in claim 10, wherein said molding die is equipped to a continuous kneader having both a kneading function and an extruding function and the rectifying plate(s) are disposed in the die near the outlet thereof.

* * * * *